United States Patent
Sone

(10) Patent No.: US 9,609,146 B2
(45) Date of Patent: Mar. 28, 2017

(54) MANAGEMENT SYSTEM, MANAGEMENT DEVICE AND IMAGE FORMING APPARATUS

(71) Applicant: KYOCERA Document Solutions Inc., Osaka (JP)

(72) Inventor: Masaki Sone, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/182,000

(22) Filed: Jun. 14, 2016

(65) Prior Publication Data
US 2016/0373593 A1   Dec. 22, 2016

(30) Foreign Application Priority Data
Jun. 18, 2015   (JP) .................................. 2015-123065

(51) Int. Cl.
*H04N 1/00*   (2006.01)
*G06F 3/12*   (2006.01)

(52) U.S. Cl.
CPC ......... *H04N 1/00084* (2013.01); *G06F 3/121* (2013.01); *G06F 3/1222* (2013.01); *G06F 3/1238* (2013.01); *H04N 1/00015* (2013.01); *H04N 1/00042* (2013.01); *H04N 1/00411* (2013.01); *H04N 1/00477* (2013.01); *H04N 2201/0081* (2013.01); *H04N 2201/0094* (2013.01)

(58) Field of Classification Search
CPC .......... H04N 1/00084; H04N 1/00042; H04N 1/0048; H04N 21/25; G06F 3/121; G06F 3/1229; G06F 21/121
USPC ........... 358/1.15, 1.13; 399/11, 85; 714/798; 709/224
See application file for complete search history.

(56) References Cited

U.S. PATENT DOCUMENTS

2011/0216359 A1*  9/2011  Kamisuwa ................ G06F 3/12
                                                        358/1.15
2012/0044539 A1*  2/2012  Yamaguchi ........... G06F 21/608
                                                        358/1.16

FOREIGN PATENT DOCUMENTS

JP        H 11-284777 A     10/1999

* cited by examiner

*Primary Examiner* — Jamares Q Washington
(74) *Attorney, Agent, or Firm* — Stein IP, LLC

(57) ABSTRACT

A management device performs any one of first processing where an image forming apparatus whose operation set as a mode transfer operation is the same as an unauthorized operation detecting image forming apparatus is made to change the presently set mode transfer operation, second processing where image forming apparatuses which belong to a group that the unauthorized operation detecting image forming apparatus belongs to are made to change the presently set mode transfer operation and third processing where the image forming apparatuses which belong to the group that the unauthorized operation detecting image forming apparatus belongs to are prevented from being transferred to a maintenance mode.

9 Claims, 8 Drawing Sheets

MANAGEMENT SYSTEM, MANAGEMENT DEVICE AND IMAGE FORMING APPARATUS

This application is based upon and claims the benefit of priority from the corresponding Japanese Patent Application No. 2015-123065 filed on Jun. 18, 2015, the entire contents of which are incorporated herein by reference.

BACKGROUND

The present disclosure relates to a management system which includes a management device for managing a plurality of image forming apparatuses and to the management device and the plurality of image forming apparatuses which form the management system.

In some image forming apparatuses such as a multifunctional machine, a copying machine and a facsimile machine, a maintenance mode for performing a maintenance operation is incorporated. For example, in the maintenance mode, the adjustment of the image forming apparatus can be performed.

Here, when a general user transfers the image forming apparatus to the maintenance mode to perform, for example, the adjustment of the image forming apparatus without permission, the image forming apparatus may be prevented from being operated properly. Hence, in general, in the image forming apparatus, an operation for transferring to the maintenance mode (hereinafter referred to as a mode transfer operation) is previously set. Then, when the mode transfer operation is not performed on the image forming apparatus, the image forming apparatus cannot be transferred to the maintenance mode. For example, conventionally, in a facsimile machine serving as an image forming apparatus, an operation for inputting a numeric value may be set as the mode transfer operation.

SUMMARY

According to a first aspect of the present disclosure, there is provided a management system including a plurality of image forming apparatuses and a management device. Each of the plurality of image forming apparatuses incorporates a maintenance mode for performing a maintenance operation and is transferred to the maintenance mode when detecting a mode transfer operation previously set for the present image forming apparatus. The management device manages the plurality of image forming apparatuses. Each of the plurality of image forming apparatuses determines whether or not an operation performed on the present image forming apparatus satisfies a predetermined unauthorized operation condition and detects the operation satisfying the unauthorized operation condition as an unauthorized operation. An unauthorized operation detecting image forming apparatus among the plurality of image forming apparatuses which is an image forming apparatus that detects the unauthorized operation is transferred to a warning mode and transmits, to the management device, a warning notification that the unauthorized operation is detected. When the management device receives the warning notification, the management device performs any one of first processing where among the plurality of image forming apparatuses, an image forming apparatus other than the unauthorized operation detecting image forming apparatus which belongs to the same group as a group that the unauthorized operation detecting image forming apparatus belongs to and whose operation set as the mode transfer operation is the same as the mode transfer operation of the unauthorized operation detecting image forming apparatus is made to change the presently set mode transfer operation, second processing where among the plurality of image forming apparatuses, all the image forming apparatuses other than the unauthorized operation detecting image forming apparatus which belong to the same group as the group that the unauthorized operation detecting image forming apparatus belongs to are made to change the presently set mode transfer operation and third processing where among the plurality of image forming apparatuses, all the image forming apparatuses other than the unauthorized operation detecting image forming apparatus which belong to the same group as the group that the unauthorized operation detecting image forming apparatus belongs to are prevented from being transferred to the maintenance mode.

According to a second aspect of the present disclosure, there is provided a management device for managing a plurality of image forming apparatuses each of which incorporates a maintenance mode for performing a maintenance operation and each of which is transferred to the maintenance mode when detecting a mode transfer operation previously set for the present image forming apparatus, the management device including a management communication portion and a management control portion. The management communication portion receives, from an unauthorized operation detecting image forming apparatus among the plurality of image forming apparatuses that is an image forming apparatus detecting an unauthorized operation, a warning notification that the unauthorized operation is detected. The management control portion performs, when the management communication portion receives the warning notification, any one of first processing where among the plurality of image forming apparatuses, an image forming apparatus other than the unauthorized operation detecting image forming apparatus which belongs to the same group as a group that the unauthorized operation detecting image forming apparatus belongs to and whose operation set as the mode transfer operation is the same as the mode transfer operation of the unauthorized operation detecting image forming apparatus is made to change the presently set mode transfer operation, second processing where among the plurality of image forming apparatuses, all the image forming apparatuses other than the unauthorized operation detecting image forming apparatus which belong to the same group as the group that the unauthorized operation detecting image forming apparatus belongs to are made to change the presently set mode transfer operation and third processing where among the plurality of image forming apparatuses, all the image forming apparatuses other than the unauthorized operation detecting image forming apparatus which belong to the same group as the group that the unauthorized operation detecting image forming apparatus belongs to are prevented from being transferred to the maintenance mode.

According to a third aspect of the present disclosure, there is provided an image forming apparatus which incorporates a maintenance mode for performing a maintenance operation and which is transferred to the maintenance mode when detecting a mode transfer operation previously set for the present apparatus, the image forming apparatus including a control portion and a communication portion. The control portion determines whether or not an operation performed on the present apparatus satisfies a predetermined unauthorized operation condition, detects the operation satisfying the unauthorized operation condition as an unauthorized operation and transfers the present image forming apparatus to a warning mode when detecting the unauthorized operation. The communication portion makes a management device perform any one of first processing where by communicating with the management device for managing a plurality of image forming apparatuses including the present image forming apparatus and image forming apparatuses other than the present image forming apparatus and transmitting, when transfer to the warning mode is performed, a warning notification that the unauthorized operation is detected to the management device, among the plurality of image forming apparatuses, an image forming apparatus other than the present image forming apparatus which belongs to the same group as a group that the present image forming apparatus belongs to and whose operation set as the mode transfer operation is the same as the mode transfer operation of the present image forming apparatus is made to change the presently set mode transfer operation, second processing where among the plurality of image forming apparatuses, all the image forming apparatuses other than the present image forming apparatus which belong to the same group as the group that the present image forming apparatus belongs to are made to change the presently set mode transfer operation and third processing where among the plurality of image forming apparatuses, all the image forming apparatuses other than the present image forming apparatus which belong to the same group as the group that the present image forming apparatus belongs to are prevented from being transferred to the maintenance mode.

DETAILED DESCRIPTION

<Outline of Management System>

Figure 1:
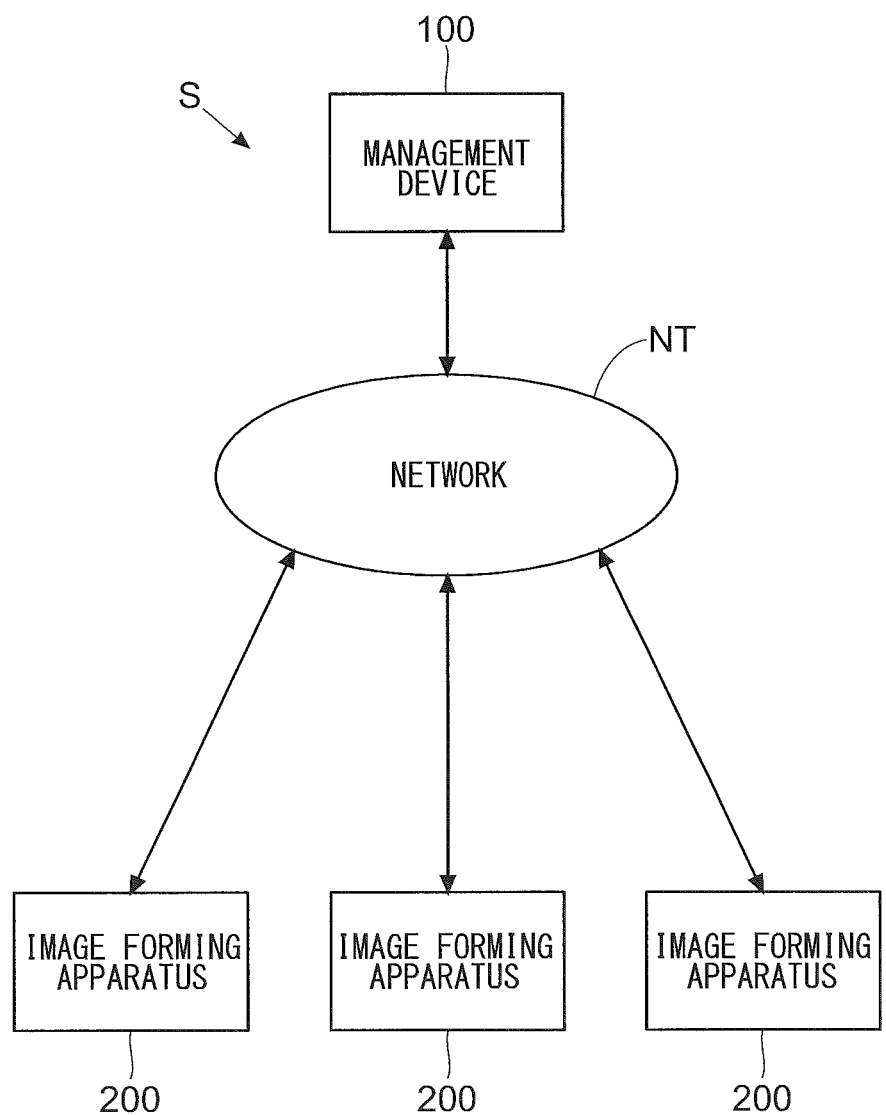
FIG. 1 is a schematic diagram of a management system according to an embodiment of the present disclosure.

As shown in FIG. 1, the management system S of the present embodiment includes a management device 100 and a plurality of image forming apparatuses 200. The device and the apparatuses included in the management system S are connected to each other through a network NT such that they can communicate with each other.

The management device 100 is, for example, a server (computer) in a support center which is operated by a maker of the image forming apparatus 200. The management device 100 is installed, and thus it is possible to remotely maintain and manage the image forming apparatuses 200 included in the management system S. In other words, a maintenance person in the support center uses the management device 100 to provide a maintenance and management service to the image forming apparatuses 200 (the users thereof).

Although the image forming apparatus 200 is not particularly limited, it is a multifunctional machine, a copying machine, a facsimile machine or the like. Although the number of image forming apparatuses 200 within the management system S (the number of image forming apparatuses 200 remotely maintained and managed by the management device 100) is also not particularly limited, at least two or more image forming apparatuses 200 are placed under management by the management device 100. Furthermore, the types of image forming apparatuses 200 within the management system S may be the same as each other or may be different from each other. In other words, the image forming apparatuses 200 of different types may be mixed within the management system S.

<Configurations of Device and Apparatuses Included in Management System>

The management device 100 will first be described with reference to FIG. 2.

Figure 2:
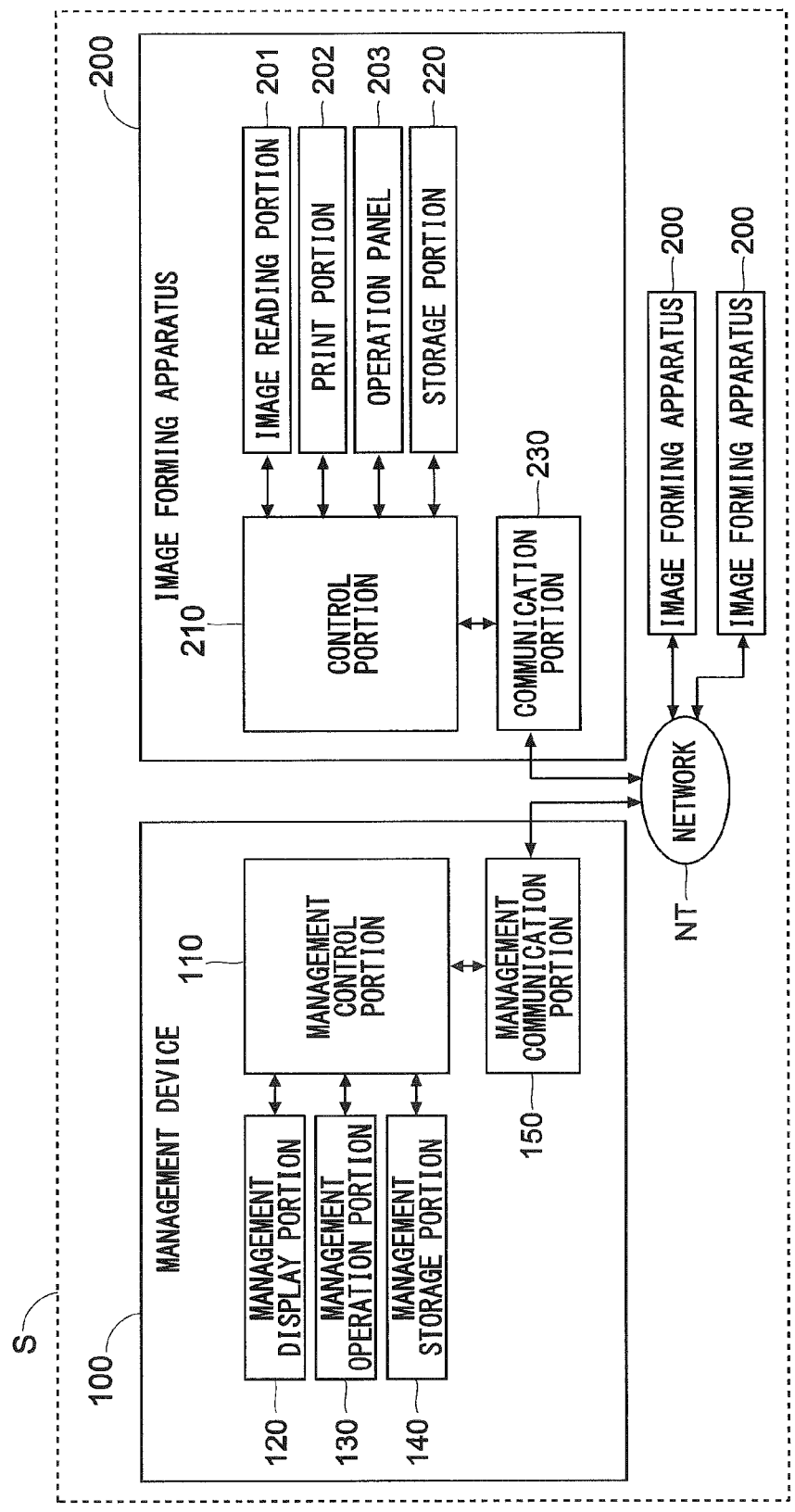
FIG. 2 is a diagram showing an example of the hardware configurations of a management device and a plurality of image forming apparatuses included in the management system according to the embodiment of the present disclosure.

As shown in FIG. 2, the management device 100 includes a management control portion 110, a management display portion 120, a management operation portion 130, a management storage portion 140 and a management communication portion 150.

The management control portion 110 performs overall control on the management device 100. The management display portion 120 is, for example, a display device (display such as an LCD) connected to the management control portion 110, and displays various types of screens. The management operation portion 130 is, for example, an input device (such as a hardware keyboard or a pointing device) connected to the management control portion 110, and receives various types of inputs. The management storage portion 140 stores programs and data for controlling the management device 100. Based on the programs and data for control stored in the management storage portion 140, the management control portion 110 controls a display operation in the management display portion 120 and detects an operation performed on the management operation portion 130.

The management communication portion 150 is connected through the network NT to the image forming apparatuses 200 such that the management communication portion 150 can communicate with the image forming apparatuses 200. The management communication portion 150 is controlled by the management control portion 110 to communicate with the image forming apparatuses 200. For example, the management control portion 110 provides, through the management communication portion 150, an instruction on maintenance to the image forming apparatuses 200. The management control portion 110 receives, through the management communication portion 150, a notification on maintenance from the image forming apparatuses 200 (acquires information indicating the state of the image forming apparatuses 200 from the image forming apparatuses 200).

The image forming apparatuses 200 will then be described with reference to FIGS. 2 to 4 using, as an example, a multifunctional machine which has a plurality of types of functions such as a copying function, a printer function, a facsimile function and a box function. The box function is the function of storing information such as image data in a storage region (for example, a folder that is provided in a storage portion 220 which will be described later) called a box.

Figure 3:
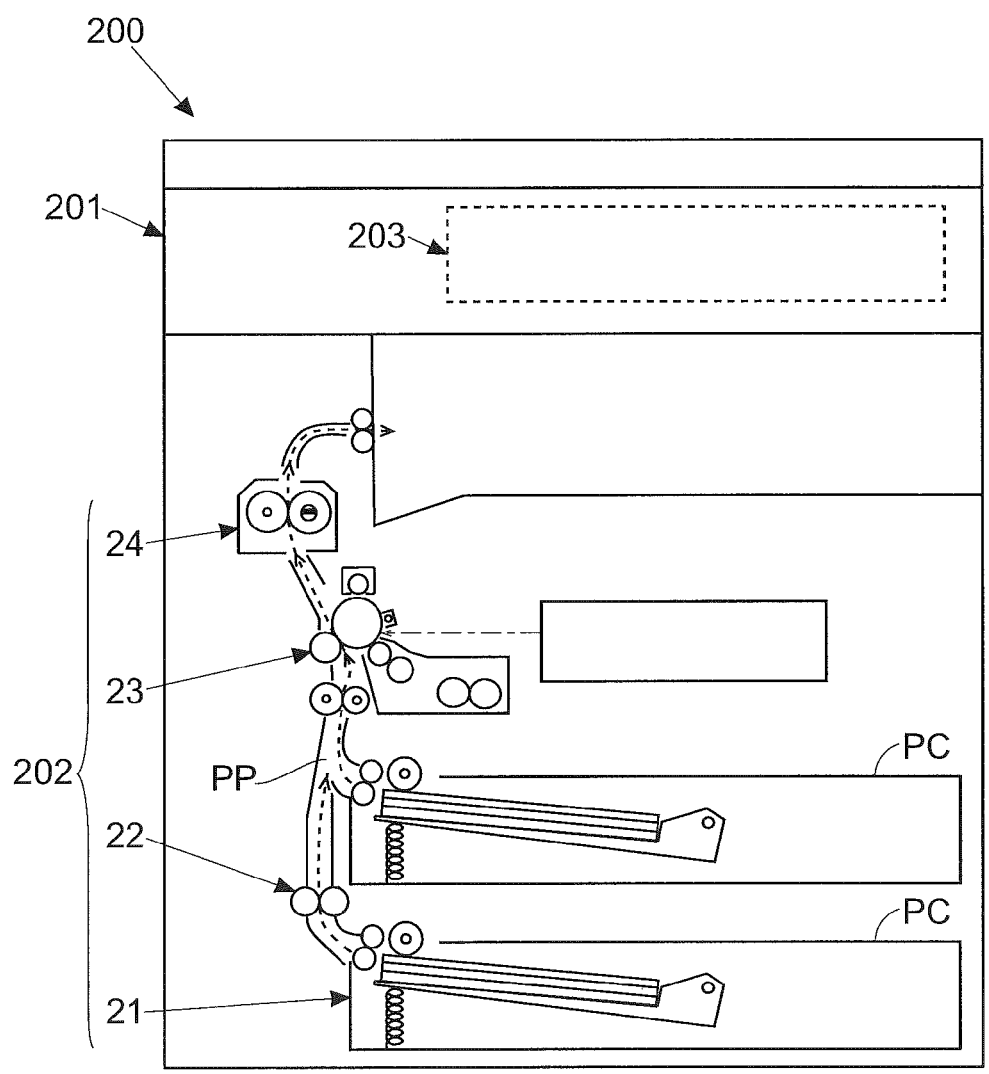
FIG. 3 is a diagram showing an example of the image forming apparatus included in the management system according to the embodiment of the present disclosure.

As shown in FIG. 3, the image forming apparatus 200 includes an image reading portion 201, a print portion 202 and an operation panel 203.

The image reading portion 201 reads an original document to generate image data on the original document. For example, various types of processing are performed, by a control portion 210 which will be described later, on the image data on the original document obtained by reading with the image reading portion 201. Then, the image data is basic data on an image printed by the print portion 202. Alternatively, the image data is basic data on facsimile data.

The print portion 202 is formed with a paper feed portion 21, a sheet transport portion 22, an image formation portion 23 and a fixing portion 24. The paper feed portion 21 supplies, to a sheet transport path PP, a sheet stored in a sheet cassette PC. The sheet transport portion 22 transports the sheet along the sheet transport path PP. The image formation portion 23 forms a toner image based on the image data and transfers the toner image to the sheet. The fixing portion 24 heats and pressurizes the toner image transferred to the sheet to fix the toner image.

The operation panel 203 is designed to receive various types of settings on the image forming apparatus 200 from the user. For example, the operation panel 203 is arranged on the front surface side (place indicated by broken lines in FIG. 3) of the image forming apparatus 200.

Figure 4:
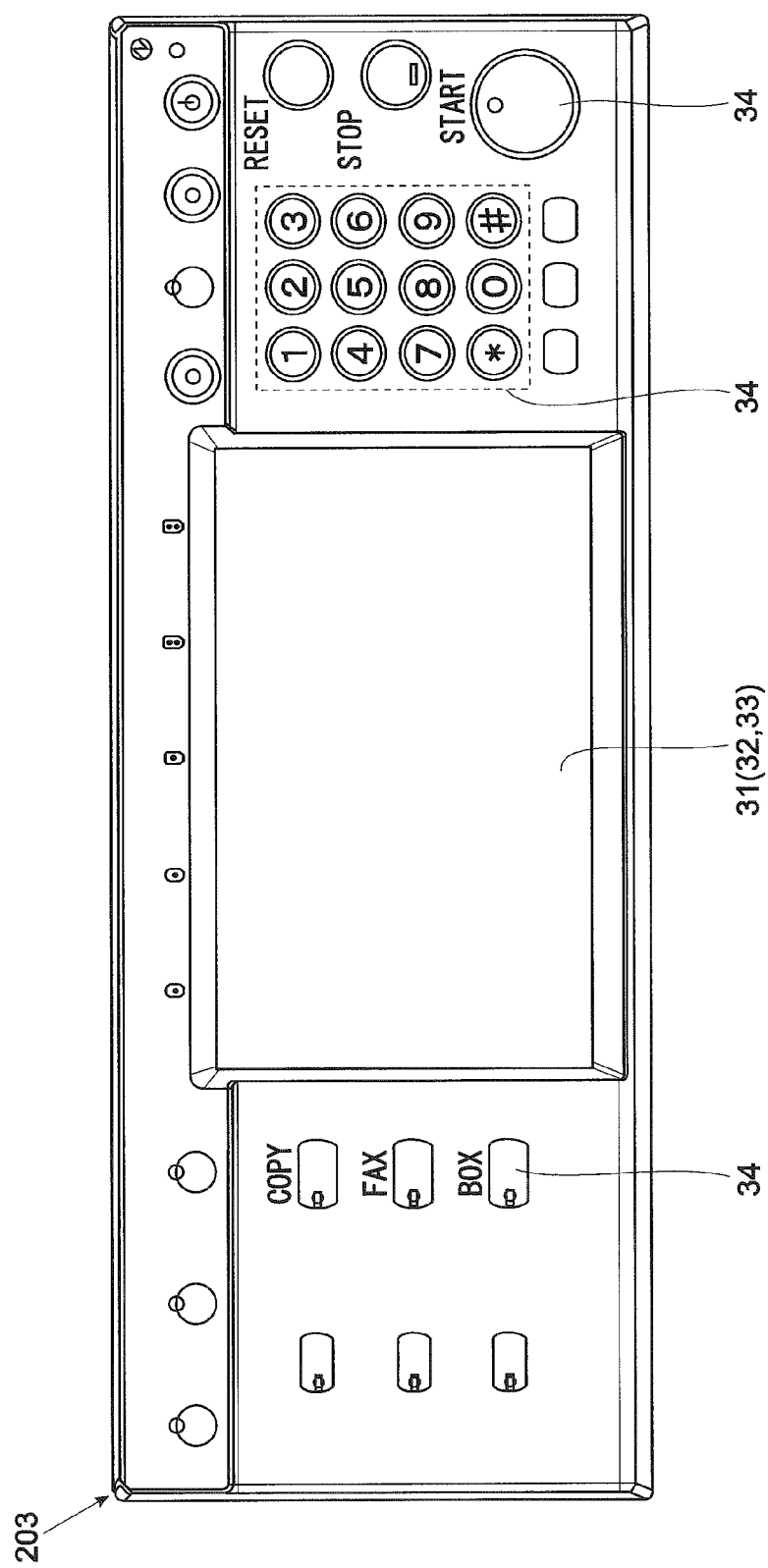
FIG. 4 is a diagram showing an example of an operation panel in the image forming apparatus included in the management system according to the embodiment of the present disclosure.

As shown in FIG. 4, in the operation panel 203, a touch panel display 31 (operation display portion) is provided. The touch panel display 31 includes a display portion 32 and a touch panel portion 33. The display portion 32 is a display panel such as a liquid crystal display panel or an organic EL display panel. The touch panel portion 33 is arranged so as to cover the display surface of the display portion 32. The touch panel display 31 displays, on the display portion 32, a soft key, a message and the like for receiving various types of settings, and receives various types of settings from the user through the touch panel portion 33 (receives a touch operation)

In the operation panel 203, hard keys 34 are also provided. For example, a plurality of hard keys 34 for receiving various types of instructions such as an instruction (start key) to start the execution of a job, an instruction (stop key) to stop a job being executed, an instruction (reset key) to reset a setting value which is input and an instruction (numeric keypad) to input a numeric value are provided on the operation panel 203. Furthermore, hard keys 34 (a copy key, a fax key and a box key) for receiving an instruction to select the function to be utilized are also provided on the operation panel 203. The hard keys 34 described here are an example, and various other types of hard keys 34 are provided on the operation panel 203.

As shown in FIG. 2, the image forming apparatus 200 includes the control portion 210. The storage portion 220 and a communication portion 230 are connected to the control portion 210.

The storage portion 220 stores the programs and data for control. Based on the programs and data for control stored in the storage portion 220, the control portion 210 performs image processing on the image data and controls the reading operation of the image reading portion 201, the print operation of the print portion 202 and the like. The control portion 210 controls the display operation of the operation panel 203 and detects operations (a touch operation on the touch panel display 31 and a press-down operation on the hard key 34) performed on the operation panel 203.

The communication portion 230 is connected through the network NT to the management device 100 (the management communication portion 150) such that they can communicate with each other. The communication portion 230 receives an instruction from the control portion 210 to communicate with the management device 100.

Although not shown in the figure, the communication portion 230 is connected to a user terminal (computer used by the user of the image forming apparatus 200) such that they can communicate with each other. In this way, it is possible to perform printing based on image data transmitted from the user terminal. It is also possible to transmit the image data obtained by reading the original document to the user terminal (to store the image data in the user terminal) and to store the image data received from the user terminal in the image forming apparatus 200.

Furthermore, the communication portion 230 incorporates a modem. In this way, it is possible to perform fax communication with an external facsimile through a telephone line or the like.

<Maintenance Mode>

Each of the image forming apparatuses 200 included in the management system S incorporates a maintenance mode. The maintenance mode is a mode in which the maintenance person performs a maintenance operation.

In the maintenance mode, for example, an operation (such as an operation for adjusting a fixing temperature when the toner image is fixed to the sheet) for adjusting each of the devices of the image forming apparatus 200 can be performed. Moreover, a backup operation and an erasing operation for information stored in the image forming apparatus 200 (such as image data stored by the user, an address book and a counter value indicating the number of sheets printed). Furthermore, an operation for returning the settings of the image forming apparatus 200 to the initial state (settings at the time of delivery) can be performed. The maintenance operations described here are an example, and in the maintenance mode, various other types of operations can be performed.

An operation for transferring the image forming apparatus 200 to the maintenance mode (hereinafter referred to as a mode transfer operation) is received by the operation panel 203. Here, when the image forming apparatus 200 is transferred to the maintenance mode by a general user (person who is not a maintenance person), and in such a state, the general user performs an adjustment operation or the like on the image forming apparatus 200 without permission, the image forming apparatus 200 may be prevented from being operated properly. In order for the occurrence of such an inconvenience to be avoided, an operation which is set as the mode transfer operation for transferring the image forming apparatus 200 to the maintenance mode is not normally performed by the general user.

In an example, an operation (for example, an operation of four to eight times) for pressing down predetermined hard keys 34 in a predetermined order is set as the mode transfer operation. A simultaneous pressing operation (for example, an operation for simultaneously pressing the copy key and the fax key) for simultaneously pressing down two or more hard keys 34, a long pressing operation for continuously pressing down a specific hard key 34 for a given period of time or the like may be included in one operation of the mode transfer operation.

In another example, an operation (for example, an operation of four to eight times) for touching, when the touch panel display 31 displays a predetermined screen, predetermined positions on the screen in a predetermined order is set as the mode transfer operation. A long pressing operation for continuously touching a specific position on the display screen for a given period of time may be included in one operation of the mode transfer operation. Furthermore, when the touch panel display 31 can simultaneously detect a plurality of touch positions, a simultaneous pressing operation for simultaneously touching two or more positions on the display screen may be included in one operation of the mode transfer operation.

Furthermore, in another example, an operation in which an operation on the hard key 34 and an operation on the touch panel display 31 are combined together may be set as the mode transfer operation. For example, an operation for touching a predetermined position on the touch panel display 31 while pressing down a predetermined hard key 34 may be set as the mode transfer operation. On the other hand, an operation for pressing down a predetermined hard key 34 while touching a predetermined position on the touch panel display 31 may be set as the mode transfer operation.

When the image forming apparatus 200 is delivered, an operation which is previously set by a maker is the mode transfer operation. Operation information indicating what type of operation the mode transfer operation is is previously stored in the storage portion 220 of the image forming apparatus 200. The control portion 210 of the image forming apparatus 200 detects, based on the operation information, whether or not the mode transfer operation is performed, and when the image forming apparatus 200 detects that the mode transfer operation is performed, the image forming apparatus 200 transfers to the maintenance mode.

Here, what type of operation is set as the mode transfer operation can be arbitrarily set (changed). For example, although not shown in the figure, when the image forming apparatus 200 is transferred to the maintenance mode, an item selection screen in which a plurality of items are choices is displayed. An item for the mode transfer operation is included in the items (choices) on the item selection screen. When the item for the mode transfer operation is selected, an operation setting screen for setting the mode transfer operation is displayed, and a setting (change) on the mode transfer operation can be performed. In other words, the operation which is presently set as the mode transfer operation can be changed to another operation.

When a setting (change) is performed on the operation setting screen, the control portion 210 of the image forming apparatus 200 rewrites the operation information stored in the storage portion 220 to information corresponding to the mode transfer operation after the change. Here, in order to perform unauthorized access prevention processing which will be described later, the management device 100 (the management storage portion 140) stores the operation information corresponding to all the image forming apparatuses 200 which are managed. Hence, when the mode transfer operation is changed, the control portion 210 transmits, through the communication portion 230, the operation information corresponding to the mode transfer operation after the change to the management device 100. ID information on the image forming apparatuses 200 and the like are transmitted together with the operation information.

In the management device 100 which receives the operation information (including the ID information) from the image forming apparatus 200, the operation information stored in the management storage portion 140 is rewritten by the management control portion 110. In other words, the management control portion 110 rewrites the operation information on the image forming apparatus 200 indicated by the ID information to the information corresponding to the mode transfer operation after the change.

<Unauthorized Access Prevention Processing>

When the image forming apparatus 200 is transferred to the maintenance mode by an unauthorized user such as a malicious third party (when an unauthorized access is performed), the information stored in the image forming apparatus 200 may be carried out or erased. If an unauthorized access is performed on a certain image forming apparatus 200, an unauthorized access may be performed on the other image forming apparatuses 200.

Hence, each of the image forming apparatuses 200 within the management system S detects whether or not an unauthorized operation (operation which is performed by an unauthorized user who attempts to perform an unauthorized access so as to identify the mode transfer operation) is performed on the present image forming apparatus 200. Then, when an unauthorized operation is performed on any one of the image forming apparatuses 200, the management device 100 performs processing (unauthorized access prevention processing) for preventing the unauthorized access.

Figure 5:
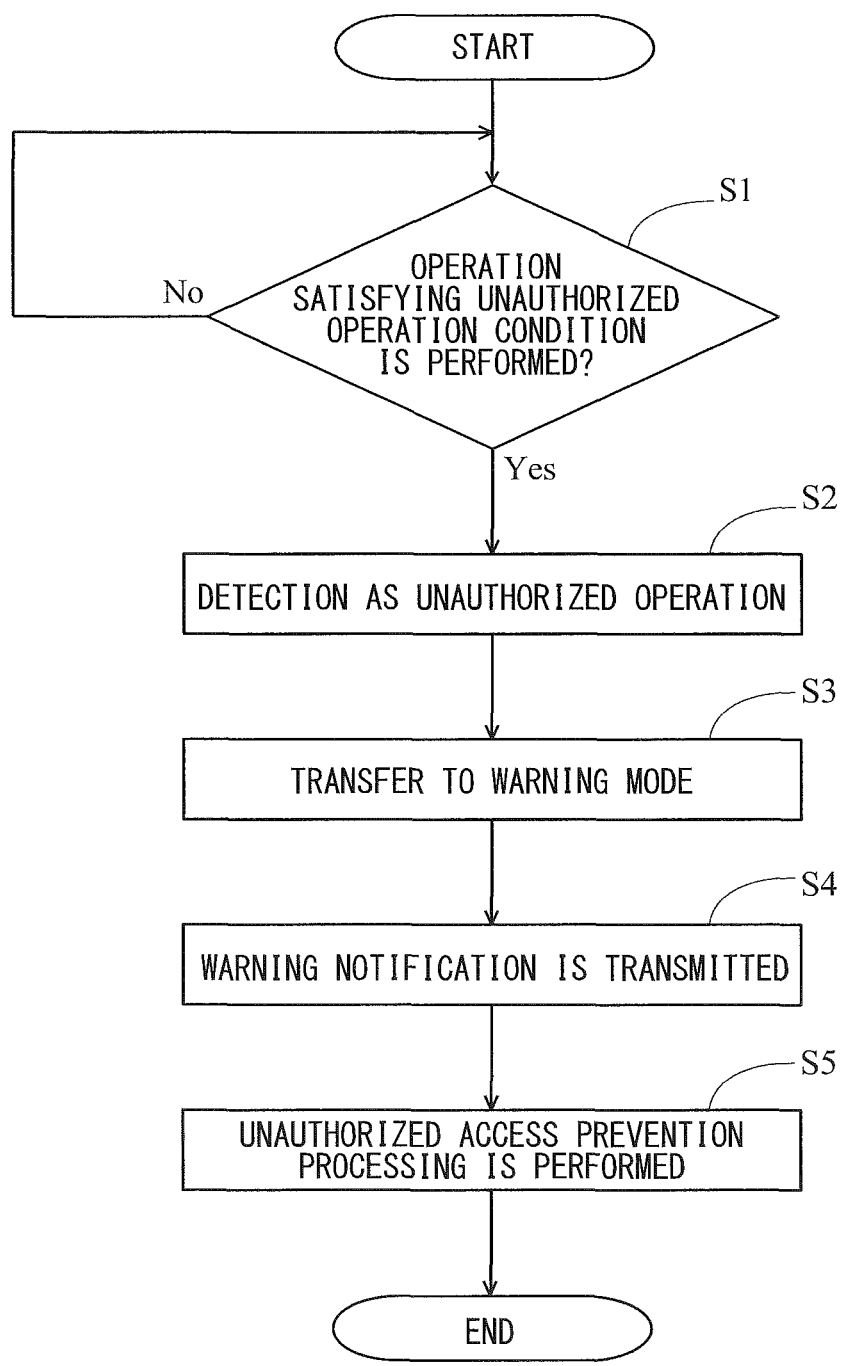
FIG. 5 is a flowchart for illustrating the flow of control when an unauthorized operation is detected in the management system according to the embodiment of the present disclosure.

The flow of control when the unauthorized operation is detected will be described below with reference to a flowchart shown in FIG. 5. The flowchart shown in FIG. 5 is started when any operation is performed on the operation panel 203 in the image forming apparatus 200.

In step S1, the control portion 210 of the image forming apparatus 200 determines whether or not an operation which satisfies a predetermined unauthorized operation condition is performed. As a result of the determination, when the operation which satisfies the unauthorized operation condition is performed, the process is transferred to step S2 whereas when the operation which satisfies the unauthorized operation condition is not performed, the determination in step S1 is repeated. When the process is transferred to step S2, the control portion 210 detects the operation performed on the present apparatus as the unauthorized operation.

Here, it is generally known that as the mode transfer operation for transferring the image forming apparatus 200 to the maintenance mode, an operation (including a simultaneous pressing operation and a long pressing operation) for pressing down predetermined hard keys 34 in a predetermined order, an operation (including a simultaneous pressing operation and a long pressing operation) for touching predetermined positions on the touch panel display 31 in a predetermined order, an operation in which they are combined together or the like is adopted. In other words, the unauthorized user recognizes that a special key for transferring to the maintenance mode is not present.

Hence, the unauthorized user repeatedly performs, on the operation panel 203, a meaningless operation (unlike an operation which is allocated as the start trigger of processing performed in the image forming apparatus 200, an operation which is not generally performed by a general user) in order to identify the mode transfer operation for transferring to the maintenance mode. For example, it is highly likely that an operation such as operations A to I listed below is performed by the unauthorized user.

(Operation A)

Operation A is an operation for simultaneously pressing down two or more hard keys 34. For example, an operation for simultaneously pressing down the copy key and the fax key, an operation for simultaneously pressing down two or more keys in a numeric keypad or the like corresponds to operation A.

(Operation B)

Operation B is an operation for simultaneously performing a press-down operation on the hard key 34 and a touch operation on the touch panel display 31.

(Operation C)

Operation C is an operation for simultaneously touching two or more positions on the touch panel display 31 when the touch panel display 31 displays a screen in which a multi-touch is not necessary.

(Operation D)

Operation D is an operation for pressing down, when the touch panel display 31 displays a predetermined screen, a hard key 34 which is not related to the predetermined screen. For example, an operation for pressing down the numeric keypad while a screen where it is impossible to input a numeric value is being displayed corresponds to operation D.

(Operation E)

Operation E is an unusually long continuous pressing operation on the numeric keypad serving as the hard keys 34. For example, a numeric keypad operation for inputting a sequence of an unusually long number of digits (for example, 10 digits or more) corresponds to operation E.

(Operation F)

Operation F is an unusually long repeating operation on a single hard key 34. For example, an operation for repeatedly pressing down the copy key or the fax key a plurality of times (for example, a few to a dozen times) corresponds to operation F.

(Operation G)

Operation G is an unusually long pressing operation on the hard key 34 or the soft key on the touch panel display 31. For example, in a configuration in which when pressing the hard key 34 or touching the soft key on the touch panel display 31 is continued for a predetermined period of time, such an operation is detected as a long pressing operation, an operation in which the pressing or the touching is continued beyond a few times the predetermined period of time corresponds to operation G.

(Operation H)

Operation H is an operation for continuously touching a position of the display screen of the touch panel display 31 where the soft key is not displayed.

(Operation I)

Operation I is an operation for performing a touch operation on the touch panel display 31 according to a certain law. For example, an operation for sequentially touching the four corners of the display screen of the touch panel display 31 corresponds to operation I.

Information indicating these operations A to I is previously stored in the storage portion 220 of the image forming apparatus 200. Then, based on whether or not an operation such as operations A to I is performed on the present apparatus, the control portion 210 of the image forming apparatus 200 detects the unauthorized operation. However, a user who is not the unauthorized user may erroneously perform an operation such as operations A to I. Hence, when an operation such as operations A to I is performed on the present apparatus only once, the control portion 210 does not detect the operation as the unauthorized operation, and the control portion 210 detects, as the unauthorized operation, an operation which satisfies a predetermined unauthorized operation condition.

Specifically, the control portion 210 of the image forming apparatus 200 determines that the unauthorized operation condition is satisfied when a normal operation (an operation which is allocated as the start trigger of processing performed in the image forming apparatus 200) is not performed, and an operation such as operations A to I is repeatedly performed a predetermined number of times or more (for example, a few to a dozen times). Alternatively, the control portion 210 determines that the unauthorized operation condition is satisfied when an operation such as operations A to I is continuously performed until a predetermined period of time has elapsed since the start of the measurement of time after the detection of the operation such as operations A to I. Then, the control portion 210 detects, as the unauthorized operation, the operation which satisfies the unauthorized operation condition.

When the unauthorized operation is detected in step S2, the process is transferred to step S3. When the process is transferred to step S3, the control portion 210 of the image forming apparatus 200 transfers to a warning mode. Although the control portion 210 may be formed such that when the unauthorized operation is detected, the control portion 210 transfers to the warning mode, the control portion 210 may be formed such that when the mode transfer operation is detected after the detection of the unauthorized operation, the control portion 210 transfers to the warning mode.

After the transfer to the warning mode, the process is transferred to step S4. When the process is transferred to step S4, the control portion 210 of the image forming apparatus 200 instructs the communication portion 230 to transmit, to the management device 100, a warning notification that the present apparatus detects the unauthorized operation. In step S5, the management device 100 which receives the warning notification performs the unauthorized access prevention processing.

As described above, the image forming apparatus 200 on which the unauthorized operation is performed (which may hereinafter be referred to as an unauthorized operation detecting image forming apparatus 200) transmits the warning notification to the management device 100. Then, when the management control portion 110 of the management device 100 receives the warning notification, the management control portion 110 performs the unauthorized access prevention processing. Here, the management control portion 110 performs, as the unauthorized access prevention processing, any one of first processing, second processing and third processing. The unauthorized access prevention processing will be specifically described below.

Figure 6:
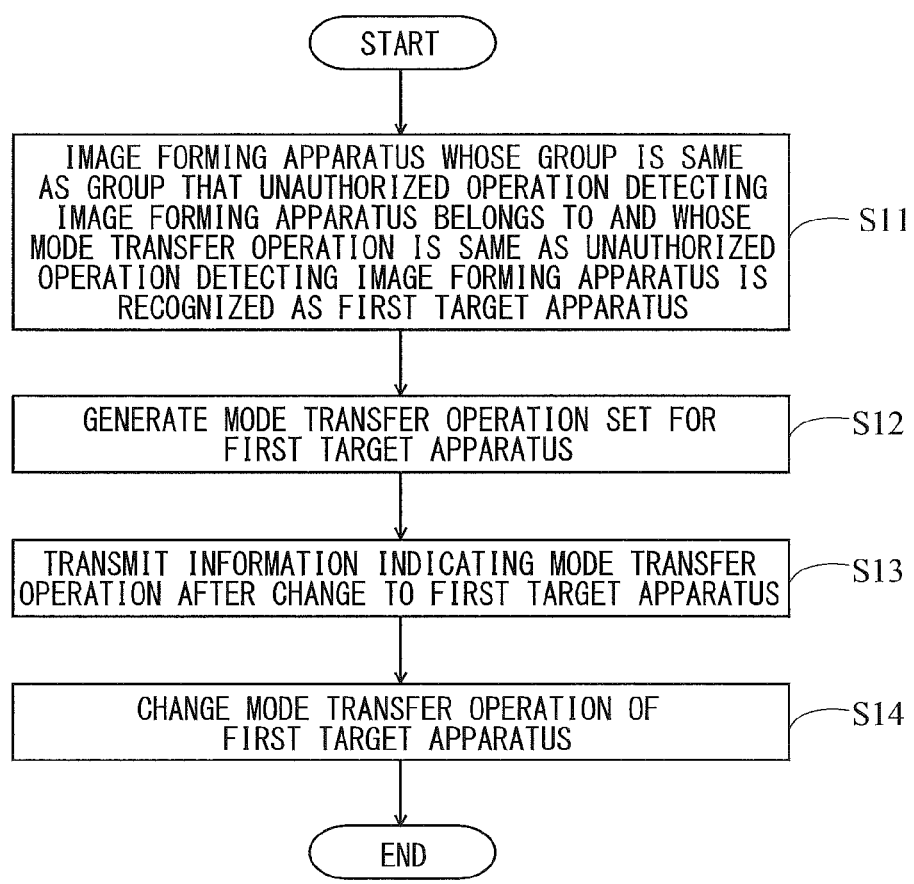
FIG. 6 is a flowchart for illustrating the flow of control when unauthorized access prevention processing (first processing) is performed in the management system according to the embodiment of the present disclosure.

The flow of control when the first processing is performed as the unauthorized access prevention processing will first be described with reference to a flowchart shown in FIG. 6. The flowchart shown in FIG. 6 is started when the management device 100 receives the warning notification from the unauthorized operation detecting image forming apparatus 200 (image forming apparatus 200 which detects the unauthorized operation).

In step S11, the management control portion 110 recognizes the image forming apparatus 200 which is a target of the first processing (which may hereinafter be referred to as a first target apparatus 200) among a plurality of image forming apparatuses 200 within the management system S. For example, the management control portion 110 searches for, with reference to the operation information on the image forming apparatuses 200, among the image forming apparatuses 200, the image forming apparatus 200 whose operation set as the mode transfer operation is the same as that of the unauthorized operation detecting image forming apparatus 200. Then, the management control portion 110 recognizes, as the first target apparatus 200, the image forming apparatus 200 whose operation set as the mode transfer operation is the same as that of the unauthorized operation detecting image forming apparatus 200.

Here, for example, the management control portion 110 classifies, based on installation places, a plurality of image forming apparatuses 200 within the management system S into groups, and treats, as a search target, only the image forming apparatus 200 which belongs to the same group as the group that the unauthorized operation detecting image forming apparatus 200 belongs to. Place information which indicates the installation places of the image forming apparatuses 200 is previously stored in the management storage portion 140. In an example, the image forming apparatuses 200 may be classified according to installation offices, and more specifically, the image forming apparatuses 200 may be classified according to installation floors. Alternatively, the image forming apparatuses 200 may be classified according to installation areas (countries). How the image forming apparatuses 200 are classified is not particularly limited.

Then, the management control portion 110 recognizes, as the first target apparatus 200, among a plurality of image forming apparatuses 200, the image forming apparatus 200 other than the unauthorized operation detecting image forming apparatus 200 whose group is the same as the group that the unauthorized operation detecting image forming apparatus 200 belongs to and whose operation set as the mode transfer operation is the same as that of the unauthorized operation detecting image forming apparatus 200. In other words, the management control portion 110 does not recognize, as the first target apparatus, the image forming apparatus 200 whose group is different from the group that the unauthorized operation detecting image forming apparatus 200 belongs to even when the operation set as the mode transfer operation is the same as that of the unauthorized operation detecting image forming apparatus 200.

However, when the first target apparatus 200 is searched for among a plurality of image forming apparatuses 200 within the management system S, the image forming apparatuses 200 may not be classified into groups. In other words, all the image forming apparatuses 200 within the management system S may be treated such that they belong to the same group. In this case, among a plurality of image forming apparatuses 200, all the image forming apparatuses 200 whose operation set as the mode transfer operation is the same as that of the unauthorized operation detecting image forming apparatus 200 are recognized as the first target apparatus 200.

After the recognition of the first target apparatus 200, the process is transferred to step S12. When the process is transferred to step S12, the management control portion 110 newly generates a mode transfer operation which is set for the first target apparatus 200. Specifically, the management control portion 110 generates, as the mode transfer operation, an operation which is completely different from the mode transfer operation which is presently set for the first target apparatus 200. For example, when the mode transfer operation before the change includes a press-down operation on the copy key or the fax key, the management control portion 110 makes a setting such that the mode transfer operation after the change does not include the press-down operation on the copy key or the fax key.

In another example, the management control portion 110 generates, as the mode transfer operation after the change, an operation (for example, an operation in which the number of times the operation is performed is increased by 4 to 8) in which the number of times the operation is performed is increased as compared with the number of times the mode transfer operation before the change is performed. For example, a setting is made such that when the number of times the mode transfer operation before the change is performed is 4, the number of times the mode transfer operation after the change is performed is 8 to 12.

In another example, the management control portion 110 generates, as the mode transfer operation after the change, an operation in which a new operation is added to the mode transfer operation before the change. For example, when the mode transfer operation before the change is an operation for pressing down the numeric keypad a few times, an operation for sequentially pressing down the copy key and the fax key is added to the operation for pressing down the numeric keypad a few times.

After the generation of the new mode transfer operation, the process is transferred to step S13. When the process is transferred to step S13, the management control portion 110 instructs the management communication portion 150 to transmit, to the first target apparatus 200, change operation information (including a change command for changing the mode transfer operation) indicating the mode transfer operation after the change. In other words, the first target apparatus 200 receives the change operation information from the management device 100.

Thereafter, in step S14, the control portion 210 of the first target apparatus 200 changes the mode transfer operation presently set for the present apparatus to the operation indicated by the change operation information (rewrites the operation information stored in the storage portion 220 based on the change operation information).

For example, after the first processing is performed, the management device 100 provides a return instruction to the first target apparatus 200, and thus the newly set mode transfer operation can be returned to the mode transfer operation before the change. Alternatively, the new mode transfer operation is performed on the first target apparatus 200 to transfer to the maintenance mode, and when a predetermined return operation for returning the mode transfer operation is performed, the mode transfer operation newly set for the first target apparatus 200 can be returned to the mode transfer operation before the change.

Figure 7:
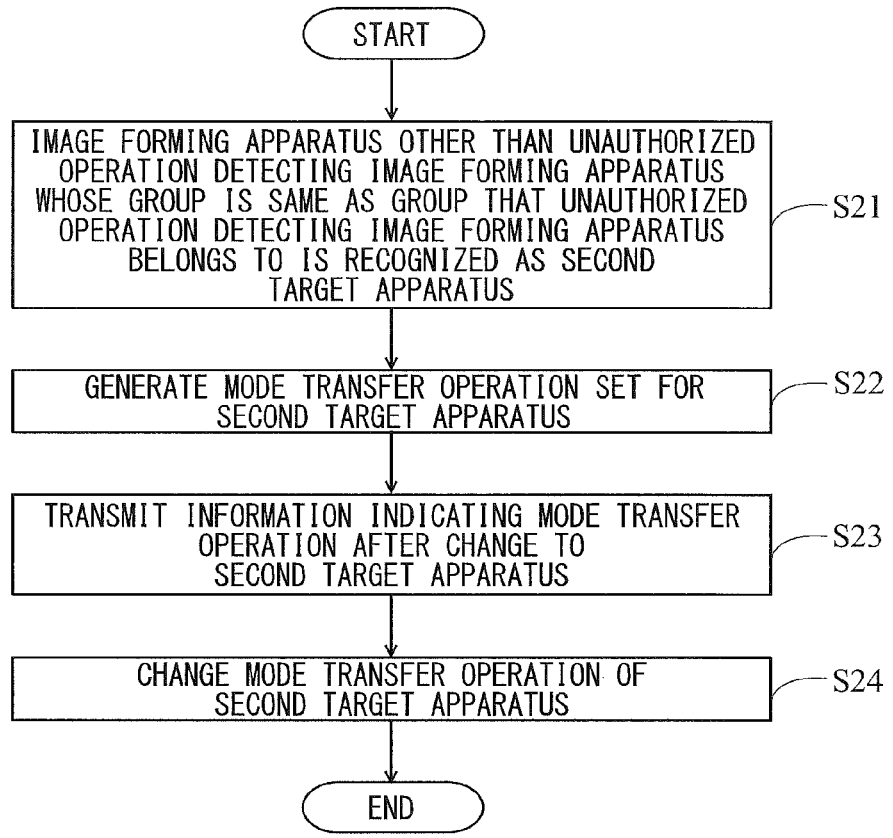
FIG. 7 is a flowchart for illustrating the flow of control when unauthorized access prevention processing (second processing) is performed in the management system according to the embodiment of the present disclosure.

The flow of control when the second processing is performed as the unauthorized access prevention processing will then be described with reference to a flowchart shown in FIG. 7. The flowchart shown in FIG. 7 is started when the management device 100 receives the warning notification from the unauthorized operation detecting image forming apparatus 200.

In step S21, the management control portion 110 recognizes the image forming apparatus 200 which is a target of the second processing (which may hereinafter be referred to as a second target apparatus 200) among a plurality of image forming apparatuses 200 within the management system S.

For example, as the first processing is performed, the management control portion 110 classifies the image forming apparatuses 200 within the management system S into groups. After they are classified into groups as described above, the management control portion 110 recognizes, as the second target apparatus 200, the image forming apparatus 200 other than the unauthorized operation detecting image forming apparatus 200 whose group is the same as the group that the unauthorized operation detecting image forming apparatus 200 belongs to.

The processing for classifying a plurality of image forming apparatuses 200 within the management system S into groups may or may not be performed. When the processing for the group classification is not performed, all the image forming apparatuses 200 within the management system S are treated such that they belong to the same group. Hence, among the image forming apparatuses 200, all the image forming apparatuses 200 other than the unauthorized operation detecting image forming apparatus 200 are recognized as the second target apparatus 200.

After the recognition of the second target apparatus 200, the process is transferred to step S22. When the process is transferred to step S22, the management control portion 110 newly generates a mode transfer operation which is set for the second target apparatus 200. Here, by the same method as in the first processing, the mode transfer operation is newly generated.

Then, in step S23, the management control portion 110 instructs the management communication portion 150 to transmits, to the second target apparatus 200, the change operation information indicating the mode transfer operation after the change. In other words, the second target apparatus 200 receives the change operation information from the management device 100.

Thereafter, in step S24, the control portion 210 of the second target apparatus 200 changes the mode transfer operation presently set for the present apparatus to the operation indicated by the change operation information (rewrites the operation information stored in the storage portion 220 based on the change operation information).

For example, after the second processing is performed, the management device 100 provides a return instruction to the second target apparatus 200, and thus the newly set mode transfer operation can be returned to the mode transfer operation before the change. Alternatively, the new mode transfer operation is performed on the second target apparatus 200 to transfer to the maintenance mode, and when a predetermined return operation for returning the mode transfer operation is performed, the mode transfer operation newly set for the second target apparatus 200 can be returned to the mode transfer operation before the change.

Figure 8:
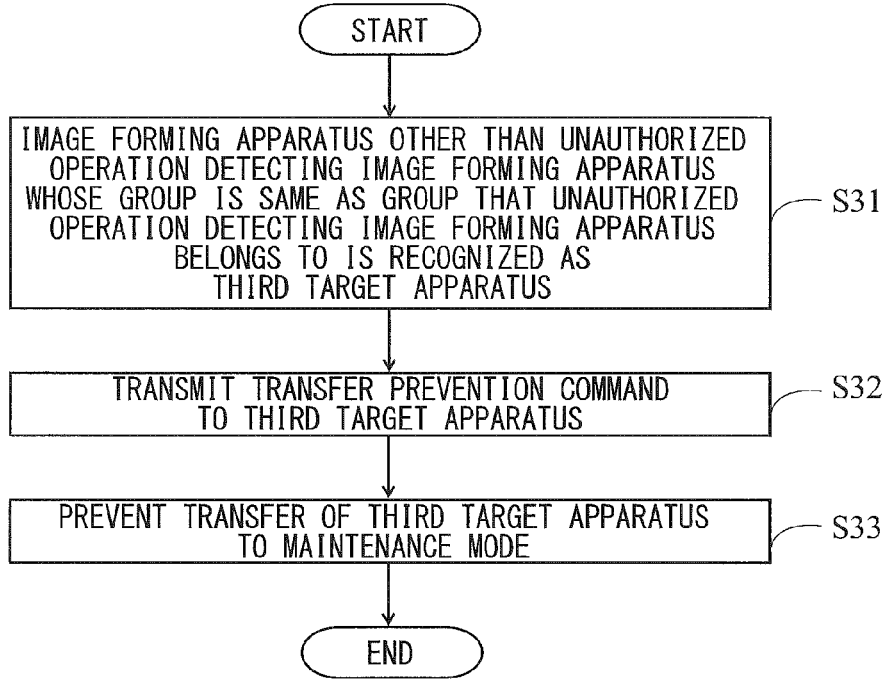
FIG. 8 is a flowchart for illustrating the flow of control when unauthorized access prevention processing (third processing) is performed in the management system according to the embodiment of the present disclosure.

The flow of control when the third processing is performed as the unauthorized access prevention processing will then be described with reference to a flowchart shown in FIG. 8. The flowchart shown in FIG. 8 is started when the management device 100 receives the warning notification from the unauthorized operation detecting image forming apparatus 200.

In step S31, the management control portion 110 recognizes the image forming apparatus 200 which is a target of the third processing (which may hereinafter be referred to as a third target apparatus 200) among a plurality of image forming apparatuses 200 within the management system S. For example, as the first processing is performed, the management control portion 110 classifies the image forming apparatuses 200 within the management system S into groups. After they are classified into groups as described above, the management control portion 110 recognizes, as the third target apparatus 200, the image forming apparatus 200 other than the unauthorized operation detecting image forming apparatus 200 whose group is the same as the group that the unauthorized operation detecting image forming apparatus 200 belongs to.

The processing for classifying a plurality of image forming apparatuses 200 within the management system S into groups may or may not be performed. When the processing for the group classification is not performed, all the image forming apparatuses 200 within the management system S are treated such that they belong to the same group. Hence, among the image forming apparatuses 200, all the image forming apparatuses 200 other than the unauthorized operation detecting image forming apparatus 200 are recognized as the third target apparatus 200.

After the recognition of the third target apparatus 200, the process is transferred to step S32. When the process is transferred to step S32, the management control portion 110 instructs the management communication portion 150 to transmit, to the third target apparatus 200, a transfer prevention command for preventing transfer to the maintenance mode. In other words, the third target apparatus 200 receives the transfer prevention command from the management device 100.

Thereafter, in step S33, the control portion 210 of the third target apparatus 200 performs processing for preventing transfer to the maintenance mode (in the third target apparatus 200, transfer to the maintenance mode is prevented). This processing is performed, and thus even when the mode transfer operation is performed on the third target apparatus 200, transfer to the maintenance mode is prevented.

After the third processing is performed, for example, the management device 100 provides a return instruction to the third target apparatus 200, and thus it is possible to return to the state in which transfer to the maintenance mode can be performed.

It is possible to arbitrarily set (change) which one of the first processing, the second processing and the third processing is performed. For example, although not shown in the figure, the management device 100 displays (the management display portion 120 displays) a selection screen for receiving, from the manager of the management device 100, the selection of processing to be performed from the first processing, the second processing and the third processing. The management device 100 receives (the management display portion 120 receives) a selection instruction on the selection screen from the manager. Then, when the management device 100 receives the warning notification, the management device 100 performs the processing selected on the selection screen from the first processing, the second processing and the third processing.

Alternatively, the processing to be performed may be changed according to the number of times the warning notification is provided. In this case, the following configuration may be adopted.

For example, the management device 100 stores (the management storage portion 140 stores) security levels which indicate the levels of the securities of the first processing, the second processing and the third processing. The first processing has the lowest security level, and the third processing has the highest security level.

Then, when the management device 100 receives the warning notification from the unauthorized operation detecting image forming apparatus 200 (the image forming apparatus 200 which receives the unauthorized operation), and the warning notification is a first warning notification provided from the group to which the unauthorized operation detecting image forming apparatus 200 belongs, the management device 100 performs the first processing which has the lowest security level. When the management device 100 has previously received the warning notification from the image forming apparatus 200 within the group to which the unauthorized operation detecting image forming apparatus 200 belongs, the management device 100 performs processing whose security level is higher than that of the processing which is performed immediately before. However, when the processing performed immediately before is the third processing (processing having the highest security level), the third processing is performed again.

Incidentally, when the image forming apparatus 200 on which the unauthorized user performs the unauthorized operation (unauthorized operation detecting image forming apparatus 200) is left without being processed, the unauthorized operation detecting image forming apparatus 200 may be transferred to the maintenance mode in an unauthorized manner. Hence, when the management device 100 receives the warning notification from the unauthorized operation detecting image forming apparatus 200, the unauthorized operation detecting image forming apparatus 200 may be prevented from being transferred to the maintenance mode. In this configuration, for example, when the management device 100 receives the warning notification from the unauthorized operation detecting image forming apparatus 200, as in the processing performed on the third target apparatus 200, the transfer prevention command for preventing transfer to the maintenance mode is transmitted to the unauthorized operation detecting image forming apparatus 200. The unauthorized operation detecting image forming apparatus 200 which receives the transfer prevention command performs processing for preventing transfer to the maintenance mode. In this way, even when the proper mode transfer operation is performed on the unauthorized operation detecting image forming apparatus 200, the unauthorized operation detecting image forming apparatus 200 is not transferred to the maintenance mode.

The unauthorized operation detecting image forming apparatus 200 is formed such that the unauthorized operation detecting image forming apparatus 200 is transferred to the warning mode (provides the warning notification) when the mode transfer operation is detected after the detection of the unauthorized operation, and thus when the transfer prevention command is received, the unauthorized operation detecting image forming apparatus 200 has already been transferred to the maintenance mode. In this case, the unauthorized operation detecting image forming apparatus 200 performs the processing for preventing transfer to the maintenance mode after the maintenance mode is returned to a normal standby state.

When the unauthorized operation is performed on any one of the image forming apparatuses 200 within the management system S, a warning that the unauthorized operation is detected may be issued. For example, when the management device 100 performs the first processing, the second processing and the third processing, the management device 100 transmits a warning command to the image forming apparatus 200 which is a target of the present processing. The management device 100 also transmits the warning command to the image forming apparatus 200 (unauthorized operation detecting image forming apparatus 200) on which the unauthorized operation is performed. The image forming apparatus 200 which receives this warning command issues a warning that the unauthorized operation is detected. All the image forming apparatuses 200 within the management system S may be formed so as to issue the warning.

Figure 9:
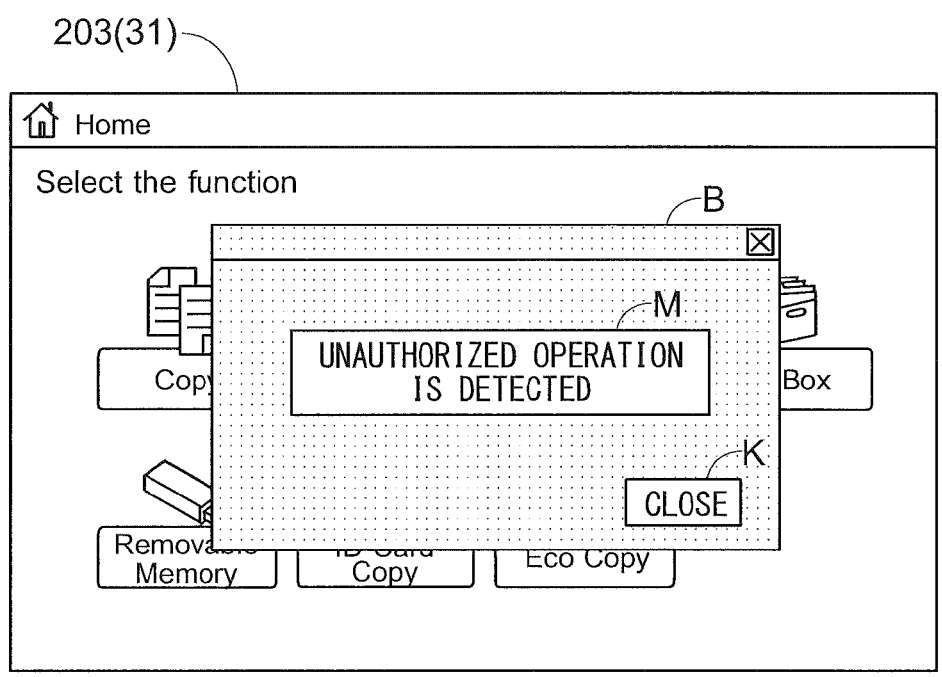
FIG. 9 is a diagram showing an example of a screen displayed when a warning that an unauthorized operation is detected is issued in the management system according to the embodiment of the present disclosure.

Although there is no particular limitation, the control portion 210 of the image forming apparatus 200 displays, on the touch panel display 31, a warning message M (message indicating that the unauthorized operation is detected) as shown in FIG. 9. For example, the warning message M is arranged in a box B and is displayed in a pop-up format. A soft key K is displayed in the box B, and when a touch operation is performed on the soft key K, the display of the warning message M (the box B) is stopped.

As described above, the management system S of the present embodiment includes: a plurality of image forming apparatuses 200 each of which incorporates the maintenance mode for performing the maintenance operation and each of which is transferred to the maintenance mode when detecting the mode transfer operation previously set for the present apparatus; and the management device 100 which manages the image forming apparatuses 200. Each of the image forming apparatuses 200 determines whether or not an operation performed on the present apparatus satisfies the predetermined unauthorized operation condition and detects the operation satisfying the unauthorized operation condition as the unauthorized operation. The unauthorized operation detecting image forming apparatus 200 among the image forming apparatuses 200 which is an image forming apparatus that detects the unauthorized operation is transferred to the warning mode and transmits, to the management device 100, the warning notification that the unauthorized operation is detected. When the management device 100 receives the warning notification, the management device 100 performs any one of the first processing where among the image forming apparatuses 200, the image forming apparatus 200 other than the unauthorized operation detecting image forming apparatus 200 which belongs to the same group as the group that the unauthorized operation detecting image forming apparatus 200 belongs to and whose operation set as the mode transfer operation is the same as the unauthorized operation detecting image forming apparatus 200 is made to change the presently set mode transfer operation, the second processing where among the image forming apparatuses 200, all the image forming apparatuses 200 other than the unauthorized operation detecting image forming apparatus 200 which belong to the same group as the group that the unauthorized operation detecting image forming apparatus 200 belongs to are made to change the presently set mode transfer operation and the third processing where among the image forming apparatuses 200, all the image forming apparatuses 200 other than the unauthorized operation detecting image forming apparatus 200 which belong to the same group as the group that the unauthorized operation detecting image forming apparatus 200 belongs to are prevented from being transferred to the maintenance mode.

In the configuration of the present embodiment, when the unauthorized operation (operation which is performed by the unauthorized user to identify the mode transfer operation) is performed on any one of the image forming apparatuses 200 within the management system S, any one of the first processing, the second processing and the third processing is performed.

In a case where the first processing is performed or in a case where the second processing is performed, even when the unauthorized user identifies the mode transfer operation, the image forming apparatuses 200 other than the unauthorized operation detecting image forming apparatus 200 are prevented from being transferred to the maintenance mode with the mode transfer operation identified by the unauthorized user. In a case where the third processing is performed, since the image forming apparatuses 200 other than the unauthorized operation detecting image forming apparatus 200 are prevented from being transferred to the maintenance mode, even when the mode transfer operation is performed, it is impossible to transfer the image forming apparatuses 200 other than the unauthorized operation detecting image forming apparatus 200 to the maintenance mode. Consequently, it is possible to reduce the unauthorized transfer to the maintenance mode.

In the present embodiment, as described above, when the management device 100 performs any one of the first processing, the second processing and the third processing, the management device 100 makes the image forming apparatus 200 which is a target of the present processing issue a warning that the unauthorized operation is detected (display the warning message M). The management device 100 also makes the unauthorized operation detecting image forming apparatus 200 issue the warning that the unauthorized operation is detected. In this configuration, it is possible to make the unauthorized user recognize that security is given (that the operation on the image forming apparatus 200 is monitored). In this way, it is possible to prevent the unauthorized act from being performed by the unauthorized user.

In the present embodiment, as described above, the management device 100 previously receives, from the manager of the management device 100, the selection of the processing to be performed as the unauthorized access prevention processing from the first processing, the second processing and the third processing. Then, when the management device 100 receives the warning notification, the management device 100 performs, as the unauthorized access prevention processing, the processing selected by the manager from the first processing, the second processing and the third processing. In this configuration, it is possible to change, according to the security system in the installation place of the image forming apparatus 200, the processing which is performed as the unauthorized access prevention processing. For example, when a place where a poor security system is present (place where the unauthorized user easily enters) is the installation place of the image forming apparatus 200, it is possible to make a setting such that as the unauthorized access prevention processing, the third processing having a high security level is performed.

In the present embodiment, as described above, the management device 100 has previously received the warning notification from the image forming apparatus 200 within the group that the unauthorized operation detecting image forming apparatus 200 belongs to, the management device 100 performs, among the first processing, the second processing and the third processing, as the unauthorized access prevention processing, processing which has a security level higher than processing performed immediately before whereas when the processing performed immediately before has the highest security level, the same processing as the processing performed immediately before is performed as the unauthorized access prevention processing. As described above, as the security level of the processing which is performed as the unauthorized access prevention processing is increased, it is possible to reduce the reoccurrence of an inconvenience in which the image forming apparatus 200 is transferred to the maintenance mode in an unauthorized manner.

In the present embodiment, as described above, when the unauthorized operation detecting image forming apparatus 200 detects the unauthorized operation or when the unauthorized operation detecting image forming apparatus 200 detects the mode transfer operation after the detection of the unauthorized operation, the unauthorized operation detecting image forming apparatus 200 is transferred to the warning mode (provides the warning notification). When the unauthorized operation detecting image forming apparatus 200 is formed such that when the unauthorized operation is detected, the unauthorized operation detecting image forming apparatus 200 is transferred to the warning mode, it is possible to rapidly perform the unauthorized access prevention processing. When the unauthorized operation detecting image forming apparatus 200 is formed such that when the mode transfer operation is detected after the detection of the unauthorized operation, the unauthorized operation detecting image forming apparatus 200 is transferred to the warning mode, and it is assumed that the unauthorized user cannot identify the mode transfer operation (though the unauthorized operation is detected, the mode transfer operation is not detected), the unauthorized access prevention processing is not performed. In other words, it is possible to reduce the unnecessary performance of the unauthorized access prevention processing.

In the present embodiment, as described above, when the management device 100 receives the warning notification, the management device 100 prevents the unauthorized operation detecting image forming apparatus 200 from being transferred to the maintenance mode. In this configuration, it is possible to reduce the following problems: the unauthorized user intentionally adjusts the unauthorized operation detecting image forming apparatus 200 in a disorganized manner; and the information, such as the address book, which is stored in the unauthorized operation detecting image forming apparatus 200 is falsified or erased.

The embodiment disclosed herein is illustrative in all respects and should not be considered restrictive. The scope of the present disclosure is indicated not by the description of the embodiment but by the scope of claims, and furthermore, meanings equivalent to the scope of claims and all modifications within the scope are included.

What is claimed is:

1. A management system comprising:
a plurality of image forming apparatuses each of which incorporates a maintenance mode for performing a maintenance operation and each of which is transferred to the maintenance mode when detecting a mode transfer operation previously set for the present image forming apparatus; and
a management device which manages the plurality of image forming apparatuses,
wherein each of the plurality of image forming apparatuses determines whether or not an operation performed on the present image forming apparatus satisfies a predetermined unauthorized operation condition and detects the operation satisfying the unauthorized operation condition as an unauthorized operation,
an unauthorized operation detecting image forming apparatus among the plurality of image forming apparatuses which is an image forming apparatus that detects the unauthorized operation is transferred to a warning mode and transmits, to the management device, a warning notification that the unauthorized operation is detected and
when the management device receives the warning notification, the management device performs any one of first processing where among the plurality of image forming apparatuses, an image forming apparatus other than the unauthorized operation detecting image forming apparatus which belongs to a same group as a group that the unauthorized operation detecting image forming apparatus belongs to and whose operation set as the mode transfer operation is the same as the mode transfer operation of the unauthorized operation detecting image forming apparatus is made to change the presently set mode transfer operation, second processing where among the plurality of image forming apparatuses, all the image forming apparatuses other than the unauthorized operation detecting image forming apparatus which belong to the same group as the group that the unauthorized operation detecting image forming apparatus belongs to are made to change the presently set mode transfer operation and third processing where among the plurality of image forming apparatuses, all the image forming apparatuses other than the unauthorized operation detecting image forming apparatus which belong to the same group as the group that the unauthorized operation detecting image forming apparatus belongs to are prevented from being transferred to the maintenance mode.

2. The management system according to claim 1, wherein when the management device performs any one of the first processing, the second processing and the third processing, the management device makes the image forming apparatus which is a target of the present processing issue a warning that the unauthorized operation is detected.

3. The management system according to claim 1, wherein the management device makes the unauthorized operation detecting image forming apparatus issue a warning that the unauthorized operation is detected.

4. The management system according to claim 1, wherein the management device previously receives, from a manager of the management device, selection of the processing to be performed from the first processing, the second processing and the third processing, and when the management device receives the warning notification, the management device performs the processing selected by the manager from the first processing, the second processing and the third processing.

5. The management system according to claim 1, wherein a security level indicating a level of security is previously set for each of the first processing, the second processing and the third processing, and when the management device has previously received the warning notification from the image forming apparatus within the group that the unauthorized operation detecting image forming apparatus belongs to, the management device performs, among the first processing, the second processing and the third processing, processing which has a security level higher than processing performed immediately before whereas when the processing performed immediately before has a highest security level, the same processing as the processing performed immediately before is performed.

6. The management system according to claim 1, wherein when the unauthorized operation detecting image forming apparatus detects the unauthorized operation or when the unauthorized operation detecting image forming apparatus detects the mode transfer operation after the detection of the unauthorized operation, the unauthorized operation detecting image forming apparatus is transferred to the warning mode.

7. The management system according to claim 1, wherein when the management device receives the warning notification, the management device prevents the unauthorized operation detecting image forming apparatus from being transferred to the maintenance mode.

8. A management device for managing a plurality of image forming apparatuses each of which incorporates a maintenance mode for performing a maintenance operation and each of which is transferred to the maintenance mode when detecting a mode transfer operation previously set for the present image forming apparatus, the management device comprising:

a management communication portion which receives, from an unauthorized operation detecting image forming apparatus among the plurality of image forming apparatuses that is an image forming apparatus detecting an unauthorized operation, a warning notification that the unauthorized operation is detected; and a management control portion which performs, when the management communication portion receives the warning notification, any one of first processing where among the plurality of image forming apparatuses, an image forming apparatus other than the unauthorized operation detecting image forming apparatus which belongs to a same group as a group that the unauthorized operation detecting image forming apparatus belongs to and whose operation set as the mode transfer operation is the same as the mode transfer operation of the unauthorized operation detecting image forming apparatus is made to change the presently set mode transfer operation, second processing where among the plurality of image forming apparatuses, all the image forming apparatuses other than the unauthorized operation detecting image forming apparatus which belong to the same group as the group that the unauthorized operation detecting image forming apparatus belongs to are made to change the presently set mode transfer operation and third processing where among the plurality of image forming apparatuses, all the image forming apparatuses other than the unauthorized operation detecting image forming apparatus which belong to the same group as the group that the unauthorized operation detecting image forming apparatus belongs to are prevented from being transferred to the maintenance mode.

9. An image forming apparatus which incorporates a maintenance mode for performing a maintenance operation and which is transferred to the maintenance mode when detecting a mode transfer operation previously set for the present image forming apparatus, the image forming apparatus comprising:

a control portion which determines whether or not an operation performed on the present image forming apparatus satisfies a predetermined unauthorized operation condition, which detects the operation satisfying the unauthorized operation condition as an unauthorized operation and which transfers the present image forming apparatus to a warning mode when detecting the unauthorized operation; and a communication portion which makes a management device perform any one of first processing where by communicating with the management device for managing a plurality of image forming apparatuses including the present image forming apparatus and image forming apparatuses other than the present image forming apparatus and transmitting, when transfer to the warning mode is performed, a warning notification that the unauthorized operation is detected to the management device, among the plurality of image forming apparatuses, an image forming apparatus other than the present image forming apparatus which belongs to a same group as a group that the present image forming apparatus belongs to and whose operation set as the mode transfer operation is the same as the mode transfer operation of the present image forming apparatus is made to change the presently set mode transfer operation second processing where among the plurality of image forming apparatuses, all the image forming apparatuses other than the present image forming apparatus which belong to the same group as the group that the present image forming apparatus belongs to are made to change the presently set mode transfer operation and third processing where among the plurality of image forming apparatuses, all the image forming apparatuses other than the present image forming apparatus which belong to the same group as the group that the present image forming apparatus belongs to are prevented from being transferred to the maintenance mode.

* * * * *